(No Model.) 2 Sheets—Sheet 2.
H. H. COLES.
MACHINE FOR TREATING FIBROUS PLANTS.
No. 443,037. Patented Dec. 16, 1890.
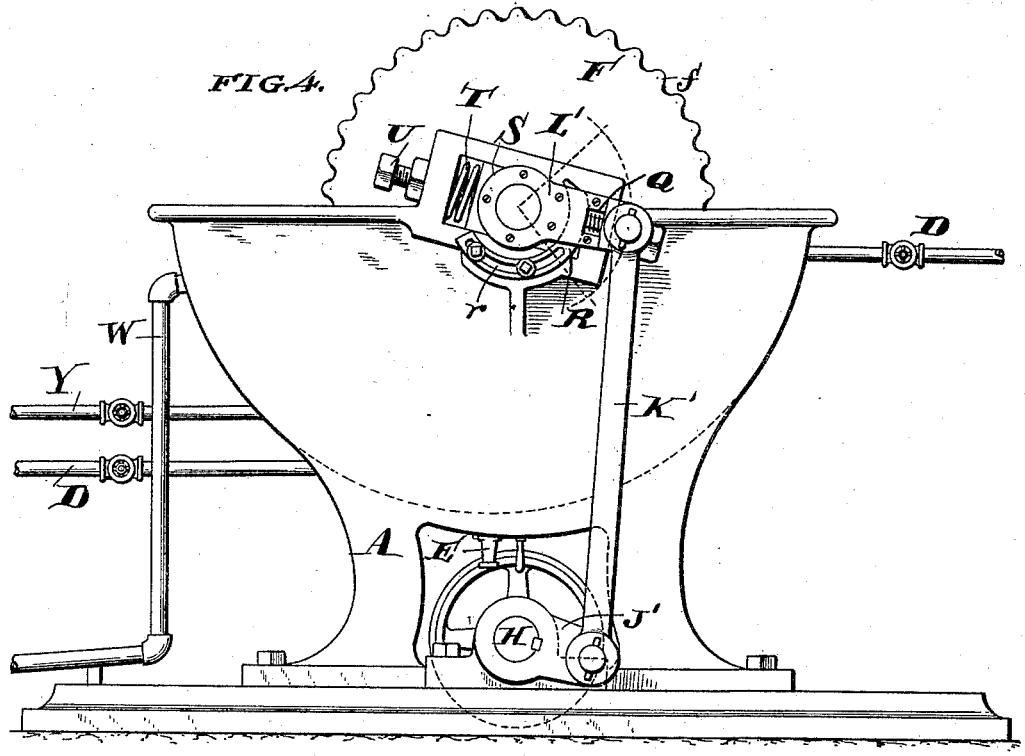
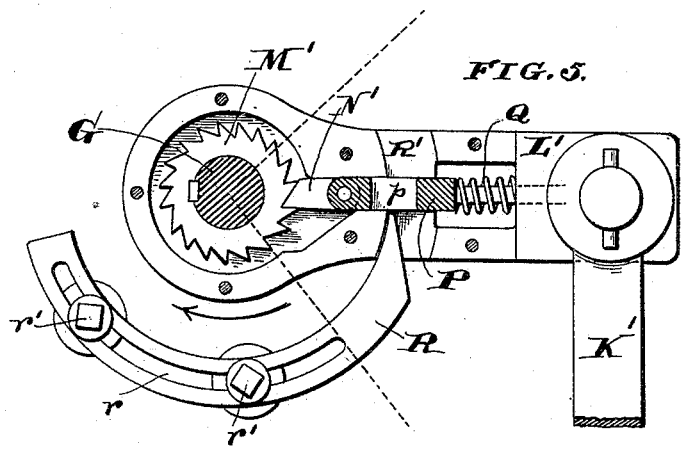
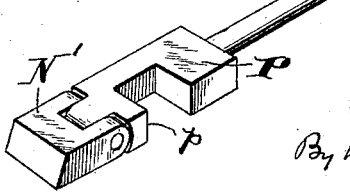
WITNESSES:
INVENTOR:
Henri H. Coles

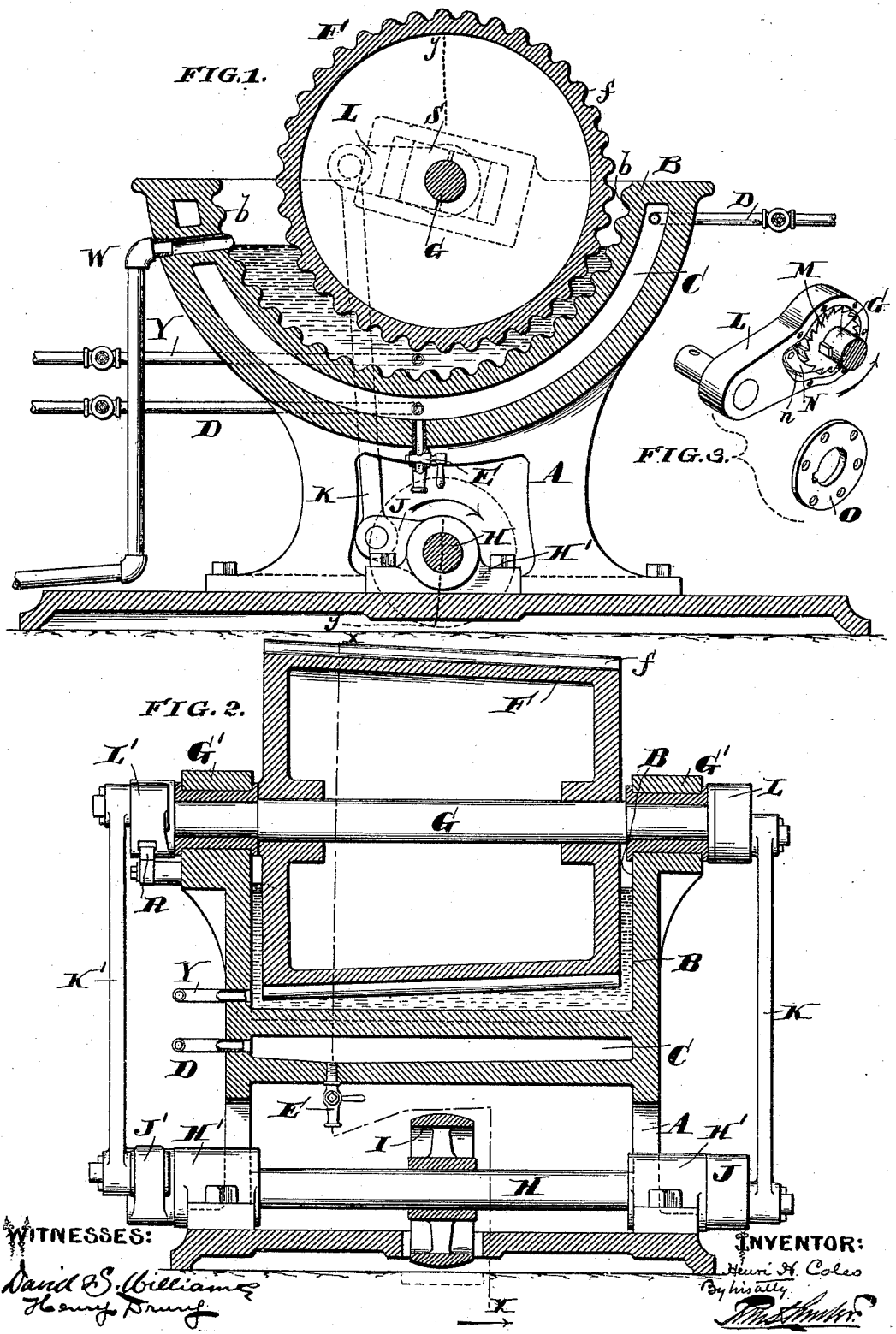

United States Patent Office.

HENRI H. COLES, OF PHILADELPHIA, PENNSYLVANIA.

MACHINE FOR TREATING FIBROUS PLANTS.

SPECIFICATION forming part of Letters Patent No. 443,037, dated December 16, 1890.

Application filed November 30, 1889. Serial No. 332,075. (No model.)

*To all whom it may concern:*

Be it known that I, HENRI H. COLES, of the city and county of Philadelphia, and State of Pennsylvania, have invented an Improvement in Machines for Treating Fibrous Plants, &c., of which the following is a specification.

My invention relates to machines for treating fibrous plants, &c.; and it consists of certain improvements, which are fully set forth in the following specification and shown in the accompanying drawings, which form a part thereof.

The object of my invention is to successfully and economically treat fibrous plants for the purpose of removing the fiber from the woody portions of the plant, so as to render it available for commercial uses.

Considerable difficulty has been experienced in the successful decortication of the jute, ramie, and similar plants, and the object of my invention is to overcome these difficulties.

In carrying out my invention I subject the plant, which may be treated either in a dry or green state, to a rolling action between suitable surfaces, by which the fibrous bark is loosened from the wood. This rolling action may be carried out while the plants are submerged in a liquid, which may, if desired, be a chemical bath for degumming the fiber and similar purposes, and I find it expedient, also, to subject the plants during this operation to a treatment with steam or hot vapor. In carrying out this operation I employ a suitable receptacle or vessel having a curved inner surface or bed, preferably provided with longitudinal corrugations. Journaled above the bed of this receptacle is a drum or cylinder, which is also preferably provided with longitudinal corrugations, and between these corrugated surfaces the plants to be treated are introduced and are operated upon, so as to be rubbed between the adjacent surfaces of the bed of the receptacle or vessel and the drum or cylinder by suitable power-transmitting devices, so that the said drum or cylinder may be rotated intermittently in opposite directions, whereby an effective rubbing of the plants against each other and against the corrugated surface of the drum and receptacle is obtained. This motion is imparted to the cylinder or drum by suitable power-transmitting devices, hereinafter more fully described, and in such a manner that the forward or feeding motion of the drum shall be greater than the opposite or backward motion, so that the plants are fed forward and out of the vessel after the fiber is loosened or freed from the wood by the rubbing process. The receptacle may contain a quantity of water or a chemical bath for the purpose of loosening the fiber from the wood, and thereby assist the rubbing operation. This bath may be heated by means of steam introduced either directly into it or into a compartment surrounding the liquor, or both, as desired.

I now refer to the drawings for greater particularity as to my improved apparatus.

Figure 1 is a sectional side elevation of my improved apparatus upon the line $x\ x$ of Fig. 2. Fig. 2 is a longitudinal sectional view of the same upon the line $y\ y$ of Fig. 1, parts being shown in elevation. Fig. 3 is a perspective view of a detachable portion of the power-transmitting devices for imparting an intermittent rotary motion in one direction to the cylinder or drum. Fig. 4 is an end elevation of my improved apparatus. Fig. 5 is a detailed view, on an enlarged scale, of the power-transmitting devices for imparting an intermittent motion to the rotary drum or cylinder, illustrated in Fig. 4; and Fig. 6 is a perspective view of the locking-bar of Fig. 5 detached.

A is the main frame of the machine, which is constructed with an open receptacle or vessel B, having a preferably semicircular hollow or concave bed open at the top and having a longitudinally fluted or corrugated inner surface $b$.

C is a steam-jacket or compartment formed about the receptacle B, through which steam may be circulated by suitable pipes D. This steam-jacket is provided with a valved outlet E.

F is a drum or cylinder, preferably constructed in the shape of a truncated cone and having a fluted or corrugated outer surface $f$. G is the shaft of this drum or cylinder, which is journaled in suitable bearings G' G' of the main frame C, and preferably eccentrical with reference to the concave semicircular bed of the receptacle B, so as to have its outer surface nearer the inner surface of said receptacle upon one side than the other, as shown in Fig. 1. I prefer this construction for the reason that it leaves a larger longitudinal opening at one side than at the other for the introduction of the plants to be treated, which are inserted longitudinally into this opening and are fed forward by the operation of the cylinder or drum F, and are decorticated or loosened of their fiber by the rubbing action between the corrugated adjacent surfaces, which thus approach closer and closer together as the fibers are fed onward. By constructing the drum or cylinder F in the shape of a truncated cone, as described, greater space is left between the adjacent surfaces of the receptacle and drum at one end than at the other, as is shown in Fig. 2. This I find expedient in treating plants in which the end of the stalk is thicker or of greater sectional area than the top, so that more space is left at one end for these large stalks than at the other, and by this means there is an equal friction or rubbing upon all parts of the stalk. It is apparent, however, that the same result may be obtained by making the bed of the receptacle B inclined longitudinally.

H is the power-shaft, journaled in suitable bearings H' H' at the base of the machine and carrying the driving-wheel I. Keyed to one end of this shaft H is a crank J, which is connected by a rod K to a crank L, journaled upon one end of the shaft G. This end of the shaft G is provided with a ratchet M, and the crank L is provided with a pivoted pawl N, adapted to engage with the teeth of the ratchet M, whereby an intermittent rotary motion will be imparted to the cylinder or drum, as is hereinafter more fully described.

O is a cap or plate fitting over the end of the crank L. (See Fig. 3.) A spring $n$ normally presses the pawl into engagement with the teeth of the ratchet M. The other end of the driving-shaft H has a crank J' connected to it similar to the crank J, but extending in the opposite direction, which by means of a connecting-rod K' is connected with a crank L', journaled upon the end of the shaft G, and carrying a sliding bolt P, formed with a recess or opening $p$, and having upon its end a pivoted pawl N', adapted to engage the teeth of the ratchet M', carried upon the end of the drum or cylinder-shaft G and corresponding to the ratchet M thereof, as has heretofore been described, but having its teeth arranged in a relatively opposite direction.

Q is a spring which normally presses forward the bolt P and brings the pivoted pawl N' into engagement with the teeth of the ratchet M'.

R is a curved sliding cam, formed with a slot $r$ and carried upon the side of the frame of the receptacle, and by means of nuts or screws $r'$ adjusted upon said frame. The crank L' is formed with a cam-guide R', in which the end of the cam R may extend. The end of this cam R is adapted to extend into or through the opening $p$ in the sliding bolt P, so that when projecting thereinto it will hold the bolt back and prevent the engagement of the pivoted pawl N' with the teeth of the ratchet M'. The ratchets M M' are arranged with their teeth in relatively opposite directions, and the cranks J and L and J' and L' are arranged oppositely, whereby an intermittent motion in relatively opposite directions will be imparted to the shaft of the drum or cylinder, the crank L operating in one direction through the pawl N and the crank L' operating in the other direction through the pawl N'. The motions will obviously be imparted alternately by reason of the opposite arrangement of the cranks J and J'.

In order to obtain a greater rotation in one direction than in the other, the sliding bolt P and the cam R are employed in connection with the shaft L', so that when the cam R is adjusted by means of the slot $r$ and adjusting screws or nuts $r'$ $r'$ that its end may project within the opening $p$ of the slide-bolt P, it will hold the pawl N' out of engagement with the teeth of the ratchet M', and thereby prevent the rotation of the shaft G. It will be seen that this cam may be so adjusted as to project into the opening $p$ through as much of the stroke of the crank L' as is desired. As is shown in Fig. 5, the operative extent of this stroke is indicated by the dotted lines, and as the crank L' descends the end of the cam R will extend into the opening $p$ of the bolt P, and during the remainder of its downward motion the pawl N' will be held out of engagement with the teeth of the ratchet M' and the shaft G will not be rotated, while in the upper portion of the downward stroke the crank L' and cam R do not project into the opening $p$, so that the pawl N' engages with the teeth of the ratchet and the shaft G will be rotated. It will readily then be seen that by the adjustment of this cam R it may be made to project into the opening $p$ through so much as is desired of the operative stroke of this crank L', so that the pawl N may be held out of operation at all times, in order that the rotary motion imparted to the cylinder or drum F will be only in one direction by means of the crank L and the other power-transmitting devices; or the cam R may be so adjusted as not to project into the opening $p$ during any portion of the stroke of the crank L', so that the pawl N' will engage with the teeth of the ratchet during the whole of the stroke of the shaft. Thus it will be seen that while the amount of rotation imparted to the shaft of the drum or cylinder by the crank L and its other power-transmitting devices is constant, the amount of rotation in the opposite direction alternately imparted by the crank L' may be adjusted to suit the convenience and to vary the amount of rubbing. The feeding or forward motion is that imparted by the crank L. I prefer to mount the shaft G of the drum or cylinder in journal-boxes S, provided with springs T, so as to allow a slight automatic adjustment upon the part of the drum or cylinder to suit itself to any slight unevenness in the material which is being operated upon. By means of adjusting-screws U the tension of these springs T may be regulated.

W is a liquid-overflow pipe from the tank or receptacle B.

The operation of my apparatus will now be readily understood. The plants to be treated—such as ramie, jute, or other fibrous plants—are inserted longitudinally in the opening between the drum or cylinder F and the inner surface or bed of the tank or receptacle B into the liquid or chemical bath therein, and are fed forward by the rotation of the drum or cylinder F, and during said feeding motion are subjected to a rubbing action in contact with each other and with the corrugated surfaces of the receptacle and drum, so as to thoroughly loosen the fiber and separate it from the woody portions of the plants. If desired, the liquid bath may be heated by means of steam introduced into it by means of a pipe Y. The liquid may further be kept in a heated condition by means of steam circulated through a steam-jacket C by means of the pipes D D.

In addition to the treatment of fibrous plants, as has been set forth, my apparatus may be used for a variety of other purposes where it is desired to subject any material to a rubbing process, or in the case of hard substances—such as minerals—for the purpose of breaking them into smaller parts.

While my invention is particularly adapted to use in connection with the decortication of fibrous plants, it is not of necessity limited thereto. Furthermore, while I prefer those details of construction herein set out and illustrated as being best adapted to the successful carrying out of the principles of my invention. I do not limit my invention thereto, as it is apparent that they may be varied in many ways without departing from the principles of it.

Having now described my invention, what I claim as new, and desire to secure by Letters Patent, is—

1. In a machine for treating fibrous plants, &c., the combination of a hollow or concave bed, a rotary drum or cylinder journaled above said bed so as to have its periphery nearer the surface of said bed at one end than at the other, and power-transmitting devices to impart to the drum or cylinder an alternating rotary motion greater in one direction than in the other.

2. In a machine for treating fibrous plants, &c., the combination of a hollow or concave bed, a rotary drum or cylinder journaled above said bed so as to have its periphery nearer the surface of said bed at one end than at the other, and power-transmitting devices to impart to the drum or cylinder a rotary motion in alternately opposite directions.

3. The combination of a hollow or concave bed and a rotary drum or cylinder journaled above said bed and having a greater diameter at one end than at the other, whereby there is a greater space between the surface of the bed and the periphery of the drum or cylinder at one end than at the other.

4. The combination of a receptacle or vessel having a concave bed, a rotary drum or cylinder journaled in said vessel, and a steam-pipe opening into said vessel below the liquor-line thereof for the purpose of introducing steam into the liquor contained therein.

5. The combination of a receptacle or vessel having a concave bed formed with a surrounding closed compartment or chamber, a rotary drum or cylinder journaled in said vessel, a steam-pipe opening into said vessel below the liquor-line thereof for the purpose of introducing steam into the liquor contained therein, and inlet and outlet pipes opening into the compartment of the concave bed to circulate steam through said compartment for the purpose of heating the vessel and the liquor therein.

6. The combination of a hollow or concave bed, a drum or cylinder having its shaft journaled above said bed, a ratchet upon each end of said shaft, cranks journaled upon the ends of said shaft, pawls carried by said cranks, and power-transmitting devices to reciprocate said cranks to impart alternately opposite rotations to said drum or cylinder.

7. The combination of a hollow or concave bed, a drum or cylinder having its shaft journaled above said bed, ratchets upon the opposite ends of said shaft, a crank journaled upon the opposite ends of said shaft, pawls carried by said cranks, power-transmitting devices to reciprocate said cranks to impart alternately opposite rotations to said drum or cylinder, and devices to control the engagement of one of said pawls with its ratchet, whereby a longer rotation may be imparted to said drum in one direction than in the other.

8. The combination of a hollow or concave bed, a drum or cylinder having its shaft journaled above said bed, ratchets upon the opposite ends of said shaft, cranks journaled upon the opposite ends of said shaft, pawls carried by said cranks, power-transmitting devices to reciprocate said cranks to impart alternately opposite rotations to said drum or cylinder, and adjustable devices to control the engagement of one of said pawls with its ratchet, whereby a longer rotation may be imparted to said drum in one direction than in the other and the length of one of said rotations may be adjusted.

9. The combination of a hollow or concave bed, a rotary drum or cylinder having its shaft journaled above said bed, a ratchet carried by said shaft, a crank journaled upon said shaft, a slotted spring-pressed bolt carried by said crank, a pawl pivoted to the end of said bolt and adapted to engage the teeth of said ratchet, power-transmitting devices to reciprocate said crank, and a cam adapted to project into the slot of said bolt to withdraw it and hold the pawl out of engagement with the teeth of said ratchet during a portion of the reciprocation of said crank.

10. The combination of a hollow or concave bed, a rotary drum or cylinder having its shaft journaled above said bed, a ratchet carried by said shaft, a crank journaled upon said shaft, a slotted spring-pressed bolt carried by said crank, a pawl pivoted to the end of said bolt and adapted to engage the teeth of said ratchet, power-transmitting devices to reciprocate said crank, and an adjustable cam adapted to project into the slot of said bolt to withdraw it and hold the pawl out of engagement with the teeth of said ratchet during a portion of the reciprocation of said crank.

In testimony of which invention I have hereunto set my hand.

HENRI H. COLES.

Witnesses:
ERNEST HOWARD HUNTER,
S. T. YERKES.